(12) United States Patent
Santarelli

(10) Patent No.: US 11,351,487 B2
(45) Date of Patent: Jun. 7, 2022

(54) WASH BUCKET DIRT FILTER

(71) Applicant: Carmine Santarelli, Mississauga (CA)

(72) Inventor: Carmine Santarelli, Mississauga (CA)

(73) Assignee: Nordica Plastics Ltd., Mississauga (CA)

(*) Notice: Subject to any disclaimer, the term of this patent is extended or adjusted under 35 U.S.C. 154(b) by 0 days.

(21) Appl. No.: 17/046,174

(22) PCT Filed: Apr. 3, 2019

(86) PCT No.: PCT/CA2019/050398
§ 371 (c)(1),
(2) Date: Oct. 8, 2020

(87) PCT Pub. No.: WO2019/200456
PCT Pub. Date: Oct. 24, 2019

(65) Prior Publication Data
US 2021/0023484 A1    Jan. 28, 2021

(51) Int. Cl.
*B01D 29/07* (2006.01)
*B01D 29/90* (2006.01)
*B01D 35/027* (2006.01)

(52) U.S. Cl.
CPC .......... *B01D 29/902* (2013.01); *B01D 29/07* (2013.01); *B01D 35/0276* (2013.01); *B01D 2201/12* (2013.01)

(58) Field of Classification Search
CPC .. B01D 29/902; B01D 29/07; B01D 35/0276; B01D 2201/12; B01D 2201/125; B01D 2201/127; B01D 35/0273
See application file for complete search history.

(56) References Cited

U.S. PATENT DOCUMENTS 6,761,271 B1   7/2004   Cresswell
7,025,880 B2   4/2006   Lamb
(Continued)

FOREIGN PATENT DOCUMENTS

CN    101481174 A    7/2009
WO    2000004979 A2   2/2000
WO    2011061553 A1  11/2015

OTHER PUBLICATIONS

WIPO, International Search Report (on a related application), dated Jun. 14, 2019.
(Continued)

*Primary Examiner* — Waqaas Ali
(74) *Attorney, Agent, or Firm* — Laurence P. Colton; Smith Tempel Blaha LLC

(57) ABSTRACT

There is provided a filter for filtering particles in a container of fluid. The filter comprises a flow director comprising a hub, a plurality of radial blades extending from the hub and a plurality of vanes concentric about the hub. The blades and the vanes intersect to form a grid which collectively define a plurality of openings, each opening extending between a first face and a second face, where a cross-sectional area of each opening decreases from the first face to the second face. The filter further includes a skirt coupled to the perimeter of the flow director for maintaining the flow director in spaced relation from a bottom of the container. The decrease in cross-sectional area of the openings in the grid helps to prevent particles from travelling from a position below the flow director to a position above the flow director.

6 Claims, 8 Drawing Sheets

(56) References Cited

U.S. PATENT DOCUMENTS

| | | | |
|---|---|---|---|
| 8,042,215 B2 | | 10/2011 | Thibault |
| D669,155 S | * | 10/2012 | Bryan .......................... D23/209 |
| D718,844 S | * | 12/2014 | Johansen ..................... D23/261 |
| 9,129,279 B1 | | 11/2015 | Valle |
| 9,192,279 B1 | * | 11/2015 | Valle ....................... A47L 13/51 |
| 2003/0136720 A1 | | 7/2003 | Lamb |
| 2013/0025454 A1 | | 1/2013 | Moredock |

OTHER PUBLICATIONS

National Intellectual Property Administration, P.R.C., First Office Action (in a related application), dated Nov. 11, 2021.
European Patent Office, Supplementary European Search Report (in a related application), dated Dec. 2, 2021.

* cited by examiner

WASH BUCKET DIRT FILTER

FIELD

This invention relates generally to filters for use in a container of fluid, and in particular, to filters for separating dirt or other particles of debris from liquid within a container.

BACKGROUND

Conventionally, when washing a vehicle or other object, a wash mitt, sponge, or washcloth is dipped into a bucket of cleaning solution before being applied to the vehicle. During washing, dirt and other particles from the vehicle or object are typically transferred to the cleaning solution within the bucket when the mitt, sponge or cloth is dipped back into the bucket or rinsed within the cleaning solution.

In order to prevent dirt and particles from being carried by the mitt, sponge or cloth from the cleaning solution back onto the vehicle or object, filters can be placed within the bucket to attempt to separate the dirt and particles from clean solution. However, churning of the cleaning solution caused by dipping the mitt, sponge or cloth back into the bucket can lift particles of dirt back into the cleaning solution and, consequently, back onto the mitt, sponge or cloth.

SUMMARY

In one aspect the invention there is provided a filter for filtering particles in a container of fluid, the filter comprising: a flow director comprising a hub, a plurality of radial blades extending from the hub and a plurality of vanes concentric about the hub, the blades and the vanes intersecting to form a grid having a first face, an opposed second face, and a perimeter, the radial blades and concentric vanes collectively defining a plurality of openings formed therebetween, each opening extending between the first face and the second face where a cross-sectional area of each opening decreases from the first face to the second face; and a skirt coupled to the perimeter of the flow director for maintaining the flow director in spaced relation from a bottom of the container, the skirt compartmentalizing the container so that the flow director acts as a divider between fluid above and below the flow director, wherein the decrease in cross-sectional area of the openings in the grid helps to prevent particles from travelling from a position below the flow director to a position above the flow director.

In another aspect of the invention there is provided A filter for filtering particles in a container of fluid, the filter comprising: a flow director comprising a hub, a plurality of radial blades extending from the hub and intersecting with a plurality of vanes concentric about the hub, the plurality of radial blades and the plurality of concentric vanes defining a first face and an opposed second face, the radial blades and concentric vanes further defining a plurality of openings, each opening extending between the first face and the second face, each of the concentric vanes in the form of an inverted V-shaped trough having a closed end and an open end, wherein the closed end of the trough forms a top edge of the concentric vane and the open end of the trough forms the bottom edge of the concentric vane, the V-shaped troughs decreasing a cross-sectional area of each opening from the first face to the second face; and a skirt coupled to a perimeter of the flow director for maintaining the flow director in spaced relation from a bottom of the container, thereby compartmentalizing the container so that the flow director acts as a divider between fluid above and below the flow director, wherein the decrease in cross-sectional area of the openings helps to prevent particles from travelling from a position below the flow director to a position above the flow director.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DESCRIPTION

The present invention may be embodied in a number of different forms. The specification and drawings that follow describe and disclose some of the specific forms of the invention.

Figure 1:
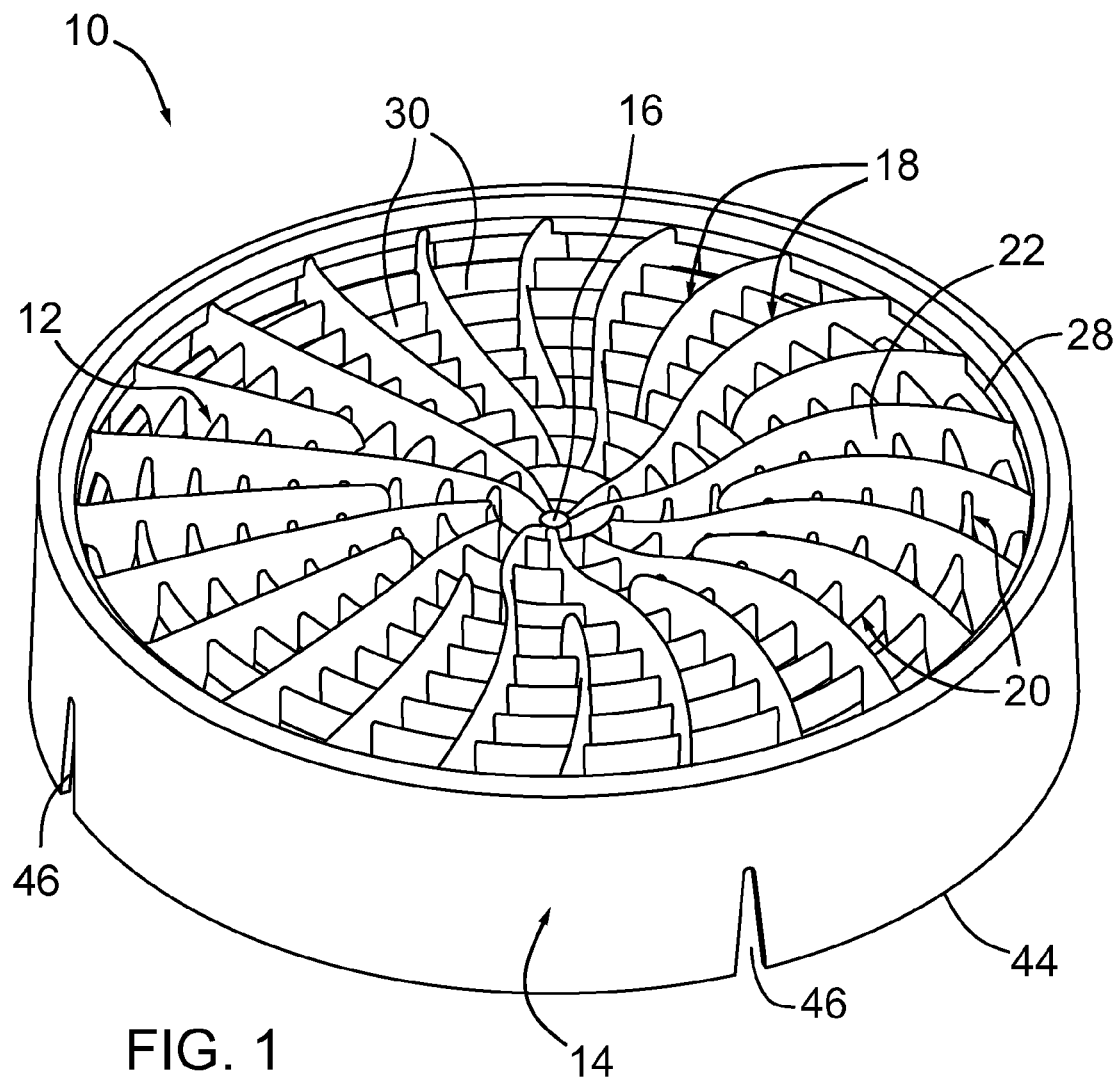
FIG. 1 is an upper perspective view of a filter according to an embodiment of the present invention.
Figure 2:
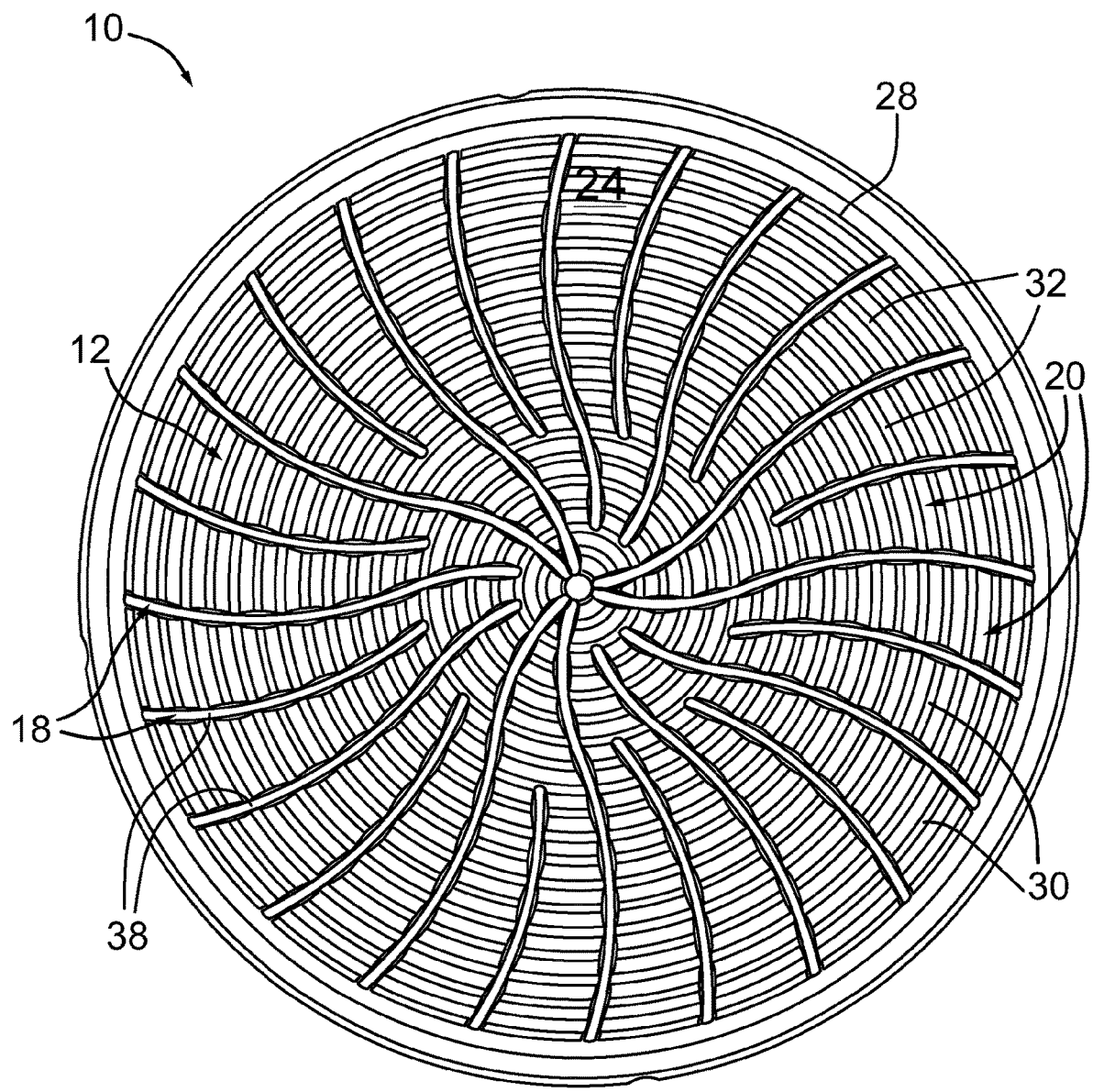
FIG. 2 is a plan view of the filter of FIG. 1.
Figure 3:
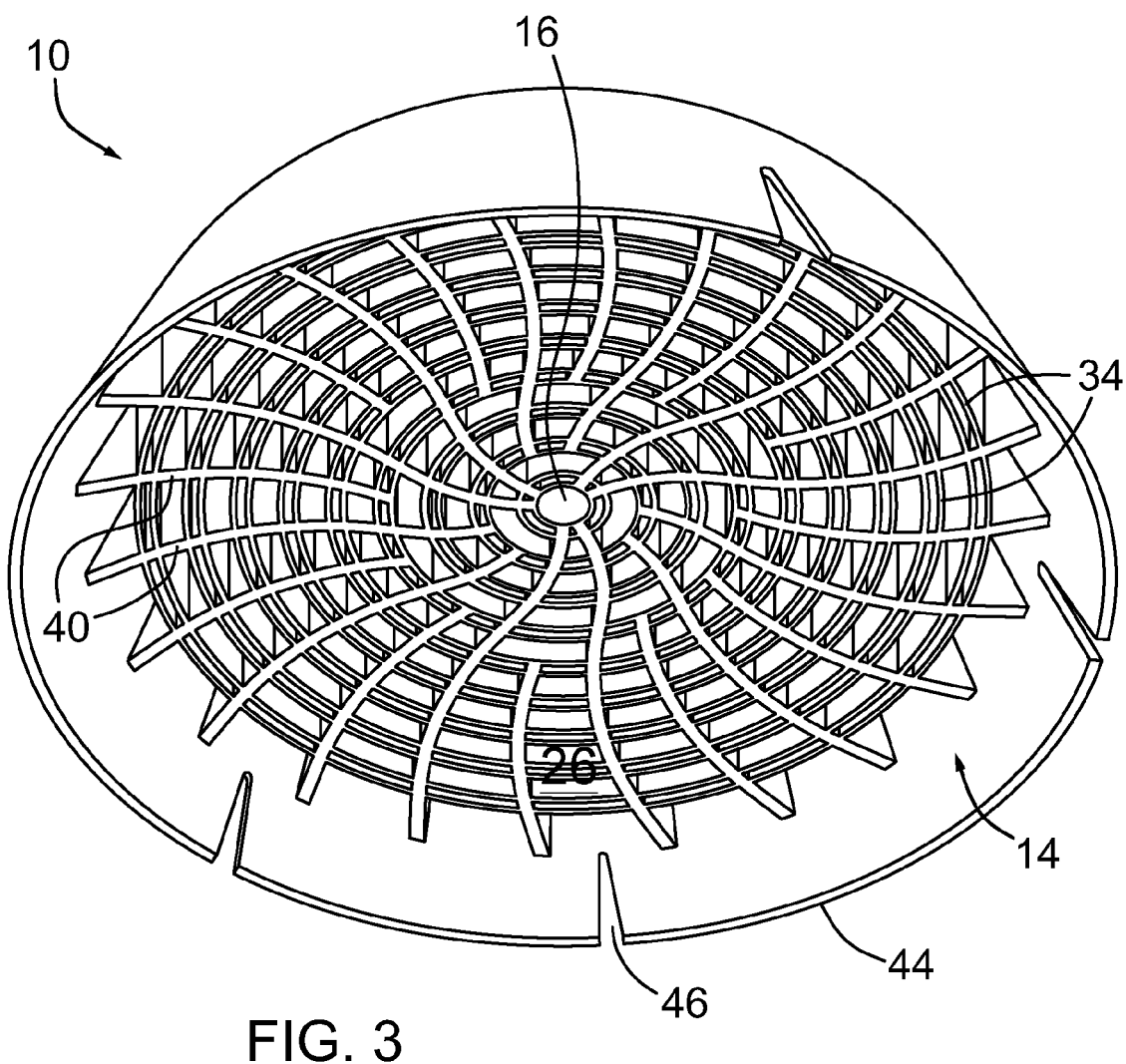
FIG. 3 is bottom perspective view of the filter of FIG. 1.

In FIGS. 1-3, there is shown a filter 10, according to an example embodiment of the present invention, for filtering particles in a container of fluid. FIGS. 4-7 show filter 10 according to a second example embodiment of the invention.

Filter 10 comprises a flow director 12 and a skirt 14 coupled thereto. Flow director 12 comprises a hub 16, a plurality of radial blades 18, extending outwardly from hub 16, and a plurality of vanes 20, generally concentric or encircling hub 16. As shown, radial blades 18 intersect with concentric vanes 20 to form a grid 22 having a first face 24 (top face) and an opposed second face 26 (bottom face). Grid 22 extends to a perimeter 28.

Radial blades 18 and concentric vanes 20 collectively define a plurality of openings 30 formed therebetween. Each opening 30 extends between first face 24 and second face 26. The cross-sectional area of each opening decreases from first face 24 to second face 26.

In use, filter 10 would typically be placed within a bucket or other such container with skirt 14 extending downwardly and supporting the filter from the bottom of the bucket or container. Preferably, skirt 14 fits relatively tight or snug against the interior surface of the bucket forming in a sense somewhat of a seal between the interior wall of the bucket and the skirt. In this configuration, openings 30 will be oriented generally vertically such that fluid and dirt particles are permitted to flow through openings 30 from a positon above flow director 12 to a position below flow director 12 (details of which are discussed in greater detail below).

The decrease in cross-sectional area of openings 30 within grid 22 helps to prevent particles from travelling from below flow director 12 upwardly past flow director 12 and into container 100 at a position above the flow director. As will be understood from the description that follows, the orientation, shape and position of the constituent parts of filter 10 help to direct fluid through the filter 10, and consequently within container 100.

Figure 5:
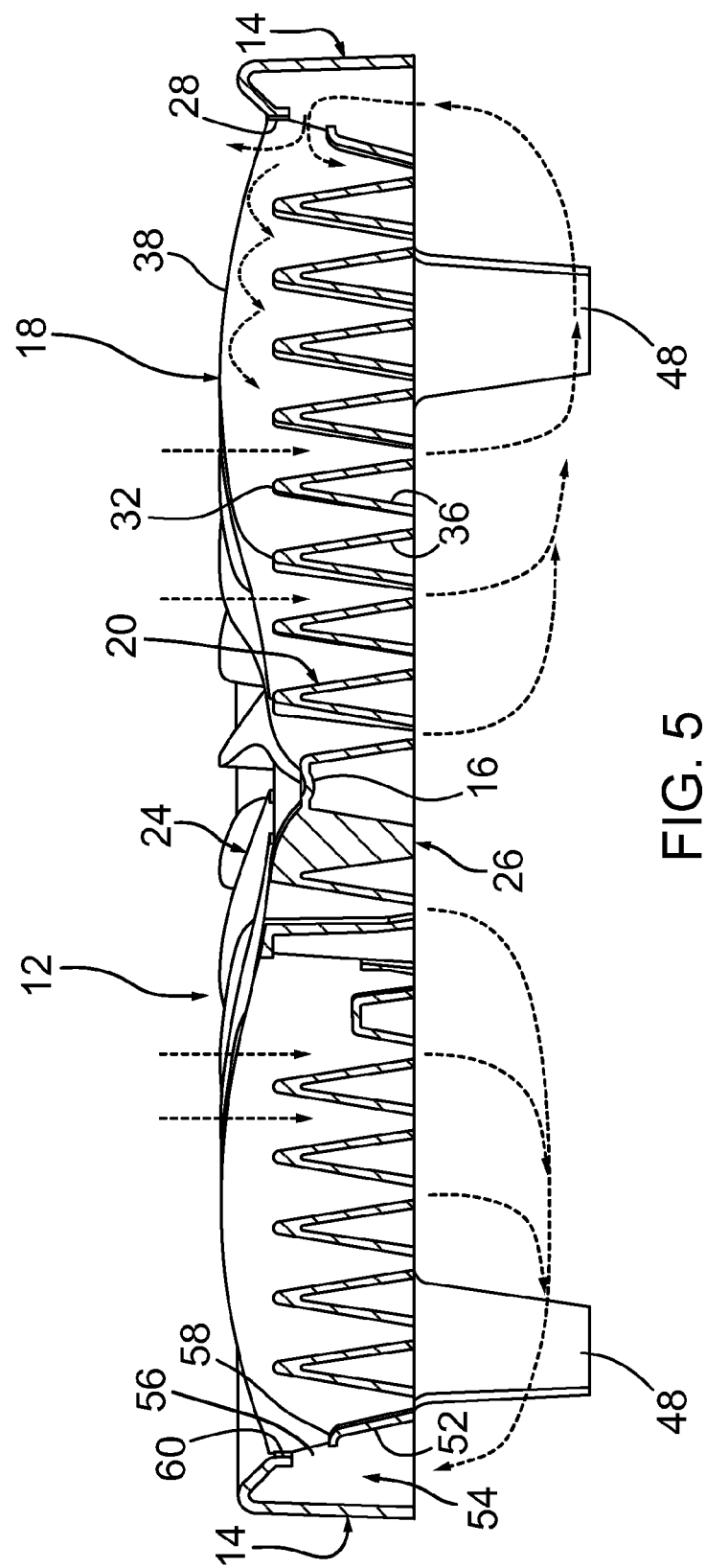
FIG. 5 is a cross-sectional view of the filter of FIG. 4 along line 5-5
Figure 6:
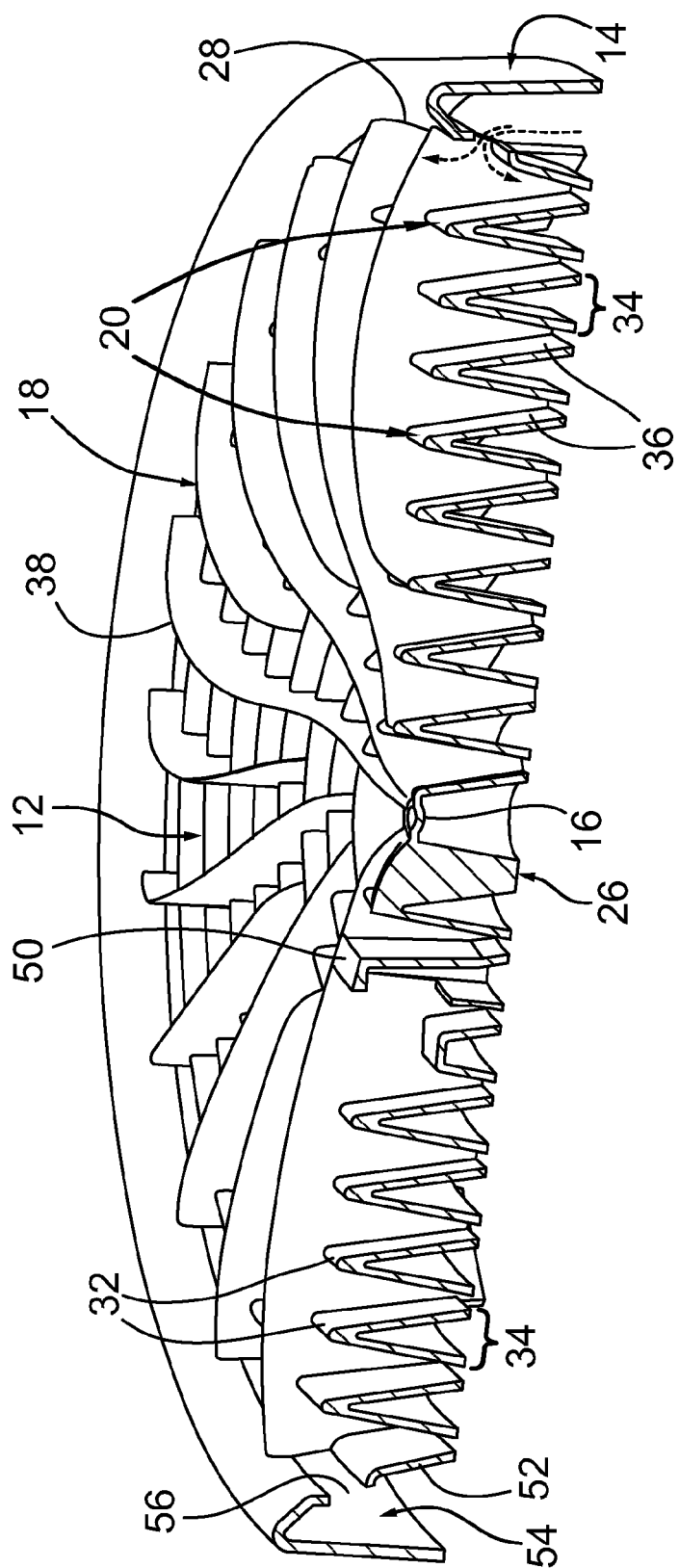
FIG. 6 is an upper perspective of the sectional view of the filter of FIG. 5.
Figure 7:
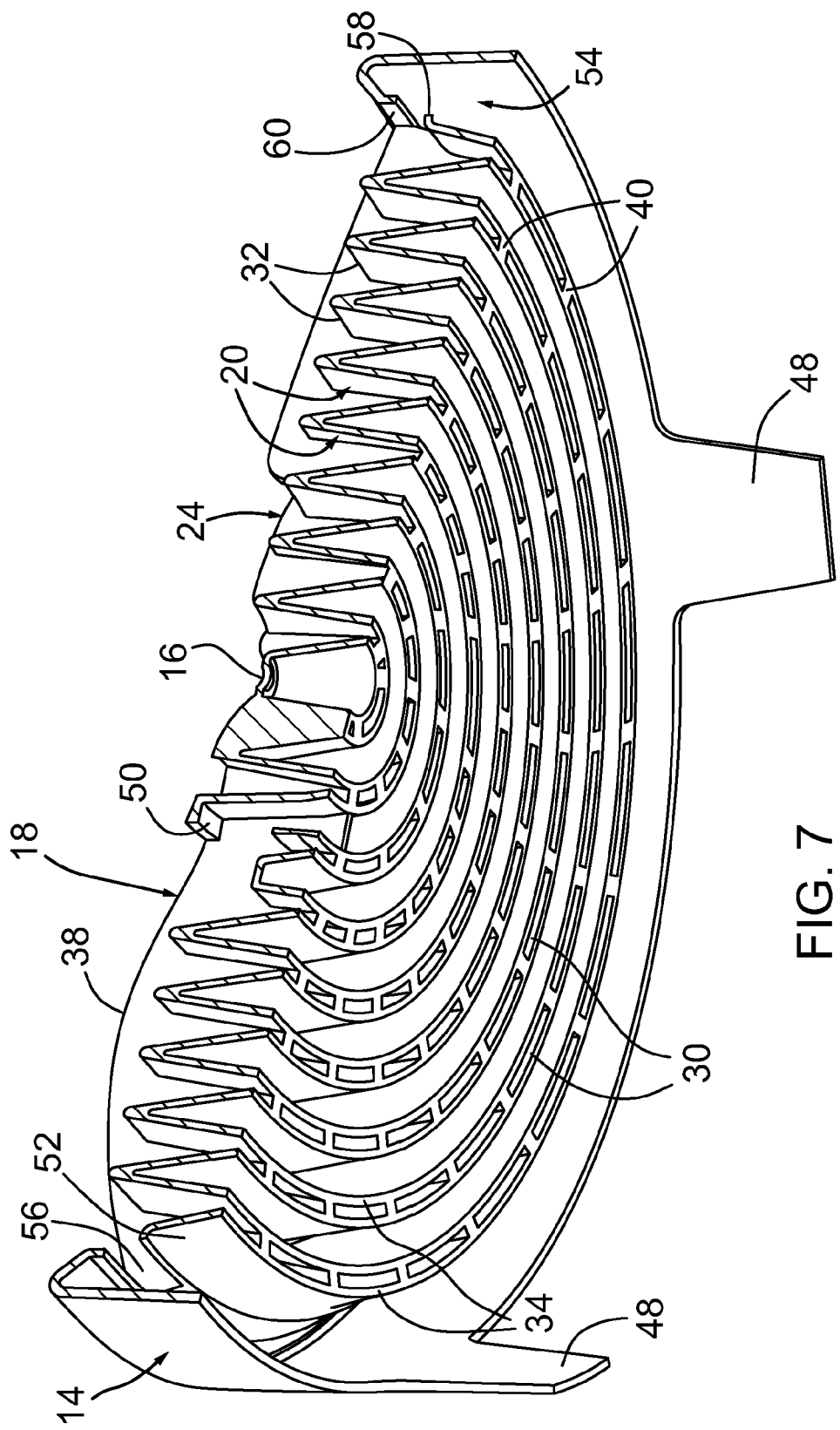
FIG. 7 is a bottom perspective view of the sectional view of the filter of FIG. 5.

The geometry of filter 10, and particularly radial blades 18 and concentric vanes 20, is best seen in FIGS. 5-7. Each concentric vane 20 has a top edge 32, adjacent first face 24, and a bottom edge 34, adjacent second face 26. Each concentric vane 20 is tapered such that top edge 32 is narrower than bottom edge 34. In the depicted embodiment, each concentric vane 20 comprises a pair of arm members joined together to form a V-shaped trough 36 having a closed end and an open end. The closed end of the trough forms top edge 32 and the open end of the trough forms bottom edge 34. As will be understood by the skilled person, the tapering of V-shaped troughs 36 thus contributes to reducing the cross-sectional area of each opening 30 from first face 24 to second face 26. In a particular application, the arms of V-shaped troughs 36 may be formed at an angle of approximately 27°, however, other angles of taper may also be used. While the V-shaped troughs are shown to have hollow interiors, in an alternate embodiment, the troughs may be filled or solid.

Each radial blade 18 has a top ridge 38, adjacent first face 24, and a bottom ridge 40, adjacent second face 26. Radial blades 18 may also be tapered such that top ridges 38 are narrower than their corresponding bottom ridges 40. However, as shown in the depicted embodiment, the degree of taper of radial blades 18 is typically much less than the degree of taper of concentric vane 20. For example, the degree of taper for radial blades 18 may be approximately 2°.

The tapering of concentric vanes 20 (and radial blades 18 if indeed they are tapered), and the associated decrease in cross-sectional area of openings 30, helps to increase the velocity of fluid as it travels downwardly in the container past flow director 12. (see the dashed lines in FIGS. 5 and 8). That is, as a wash mitt, etc is thrust into the bucket there will be imparted a downwardly directed force upon the fluid within the bucket such that fluid will be pushed downwardly through openings 30. As described in detail below, fluid will simultaneously also flow upwardly from below flow director 12 to above the flow director. As fluid moves in a downward direction through openings 30 in the flow director a type of venturi effect is created with an increase in flow velocity, or movement of fluid through openings 30, thus helping to prevent fluid and particles from travelling back up through the openings. Further, the relatively smaller cross-sectional area of openings 30 at second face 26 provides a smaller area through which particles below flow director 12 may pass, thereby further helping to prevent dirt particles from travelling upwardly within the bucket from below flow director 12.

Radial blades 18 may extend outwardly from first face 24 beyond concentric vanes 20. In the embodiment shown, top ridges 38 of radial blades 18 extend further from second face 26 than do top edges 32 of concentric vanes 20. Put another way, the height of radial blades 18 from second face 26 is greater than the height of concentric vanes 20 from second face 26. The distance between any two adjacent radial blades 18 in a horizontal plane tapers towards hub 16 (See FIG. 2 for example). This tapering between adjacent radial blades can help to direct fluid towards hub 16 and increase the velocity of fluid as it travels towards hub 16, such as when a wash mitt etc. is thrust into container 100. In other words, the tapering radial blades creates a restriction, something akin to a venturi, such that the velocity of fluid travelling towards hub 16 tends to increase. As fluid travels towards hub 16 between a pair of adjacent radial blades, a portion of the fluid will at times also tend to travel over top edges 32 of concentric vanes 20 (see the dashed arrows in FIG. 5), creating a tumbling effect. A portion of that tumbling fluid will generally fall through openings 30, carrying with it any entrained dirt particles.

In this manner, in some instances a larger volume of fluid may flow through flow director 12 proximate hub 16, from first face 24 towards second face 26, than through flow director 12 proximate perimeter 28, when a wash mitt, etc is plunged into the bucket. The dashed arrows in FIG. 5 represent some examples of the flow of fluid about filter 10.

Figure 8:
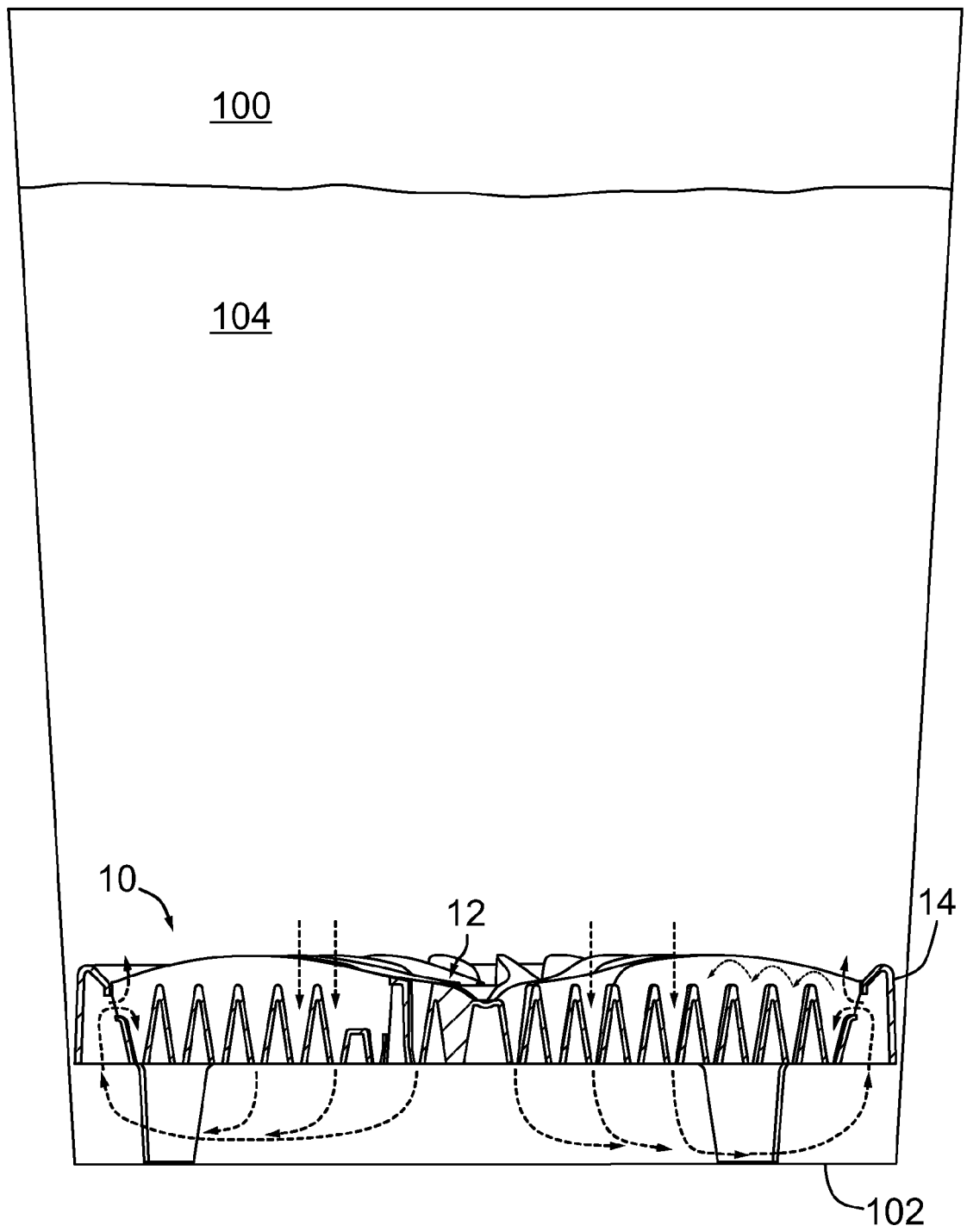
FIG. 8 is a side view of the sectional view of the filter of FIG. 5 in use within a bucket of fluid.

Skirt 14 is coupled to, or integral with, perimeter 28 of flow director 12. In the depicted embodiments, the outermost ends of radial blades 18 are fixed to skirt 14. As shown in FIG. 8, skirt 14 may be configured to maintain flow director 12 in spaced relation from a bottom 102 of a container 100. Skirt 14 thus compartmentalizes container 100 so that flow director 12 acts as a divider between fluid 104 above and below the flow director. Skirt 14 in both depicted embodiments has an increasing diameter as it extends away from second face 26, forming sloped sides. In certain embodiments, skirt 14 may extend 2° from perpendicular from first face 24, however, other degrees of taper may also be used. Skirt 14 may be formed from a pliable plastic that is deformable to accommodate the interior walls of different sized containers. In the embodiment shown of FIGS. 1-3, skirt 14 extends around perimeter 28 to an outer rim 44. Skirt 14 in FIGS. 1-3 further includes notches 46 positioned at outer rim 44 to allow the skirt to deform and sit within containers of different sizes. In the alternate embodiment shown of FIGS. 4-7, skirt 14 includes a plurality of legs 48 extending away from second face 26. Similar to the first embodiment, legs 48 are also pliable to allow filter 10 to sit within containers of different sizes.

Returning to FIGS. 5-7, skirt 14 and an outermost concentric vane 52, are configured and spaced apart to form a fluid return region 54 therebetween, and to form fluid return passageways 56.

Since a greater amount of fluid will typically be directed downwardly through the central portion of flow director 12 (on account of the structure described above and also as in most instances a wash mitt, etc will be thrust into the middle of the bucket), the fluid below flow director 12 will tend to flow towards a region of lesser pressure (i.e. towards the perimeter region, and consequently towards fluid return region 54 as indicated by the dashed arrows in FIGS. 5 and 8). Fluid return passageways 56 thus allow a portion of the fluid flowing through fluid return region 54 to flow to a position above flow director 12 and a portion of the fluid in fluid return region 54 to return to bottom 102 of container 100 below flow director 12.

As best seen in FIGS. 5-7, outermost concentric vane 52 may extend generally perpendicularly from second face 26 to form a bottom rim 58 of fluid return passageways 56. In that regard, outermost concentric vane 52 is shown to have a somewhat smaller height than the adjacent concentric vane. Skirt 14, in turn, extends above and around fluid return region 54, reaching an apex, before extending downwardly back towards outermost concentric vane 52, thereby forming a top rim 60 of fluid return passageways 56. As shown, bottom rim 58, top rim 60 and radial blades 18 collectively define the edges of fluid return passageways 56. As will be understood by the skilled person, bottom rim 58 and top rim 60 will each tend to exert drag on adjacent fluid as fluid travels through fluid return passageways 56. Drag exerted on the fluid by bottom rim 58 helps to direct heavier or particle-laden fluid through adjacent opening 30 back under flow director 12 as indicated by the dashed arrows in FIGS. 5 and 8. Drag exerted on the fluid by top rim 60 will also thus help to direct lighter, clean fluid away from bottom 102 above flow director 12 as indicated by the dashed arrows. The relative densities of the dirty or particle laden fluid vs cleaner fluid will also impact its particular path with more dense, particle laden fluid tending to fall back through openings 30 that are closest to skirt 14.

The above described structure will thus help to direct fluid that is driven downwardly within the bucket or container in a somewhat poloidal manner about flow director 12, with "dirty" fluid tending to be driven to a greater extent through the central portion of flow director 12 and "clean" fluid tending to flow to a greater extent upwardly through passageways 56. This movement of fluid helps to "filter" the fluid by encouraging dirt particles to remain below flow director 12 even as the fluid or water above flow director 12 is churned by the user.

In the particular embodiments depicted, radial blades 18 may be curved in two ways. First, as best shown in FIG. 2, radial blades 18 longitudinally arc in a common direction in a horizontal plane as they extend from skirt 14 towards hub 16, forming a fan-like configuration. This collective arcing of radial blades 18 may assist in imparting a slight rotational force to the fluid as it travels towards and through flow director 12.

Top ridges 38 of radial blades 18 also undulate in a vertical plane from perimeter 28 to hub 16. For example, as best seen in FIGS. 5 and 6, the height of radial blades 18 from second face 26 increases as they extend from perimeter 28, before decreasing as they reach hub 16. In other applications, radial blades 18 may longitudinally extend from hub 16 in a linear fashion and/or the height of top ridges 38 may stay generally constant as they end from perimeter 28 to hub 16.

As an additional feature, top edge 32 of concentric vanes 20 and top ridges 38 of radial blades 18 may be relatively narrow (for example 0.04 inches in width), and in the depicted embodiments, rounded. In this manner, particles of dirt will not be inclined to collect on top edge 32 of concentric vanes 20 and top ridges 38 of radial blades 18, and will tend to fall through openings 30. Further, the rounded nature of top edge 32 of concentric vanes 20 and top ridges 38 of radial blades 18 allows the user to rub or scrub the wash mitt, sponge or cloth, over first face 24 of flow director 12 without damaging the mitt, sponge or washcloth.

Figure 4:
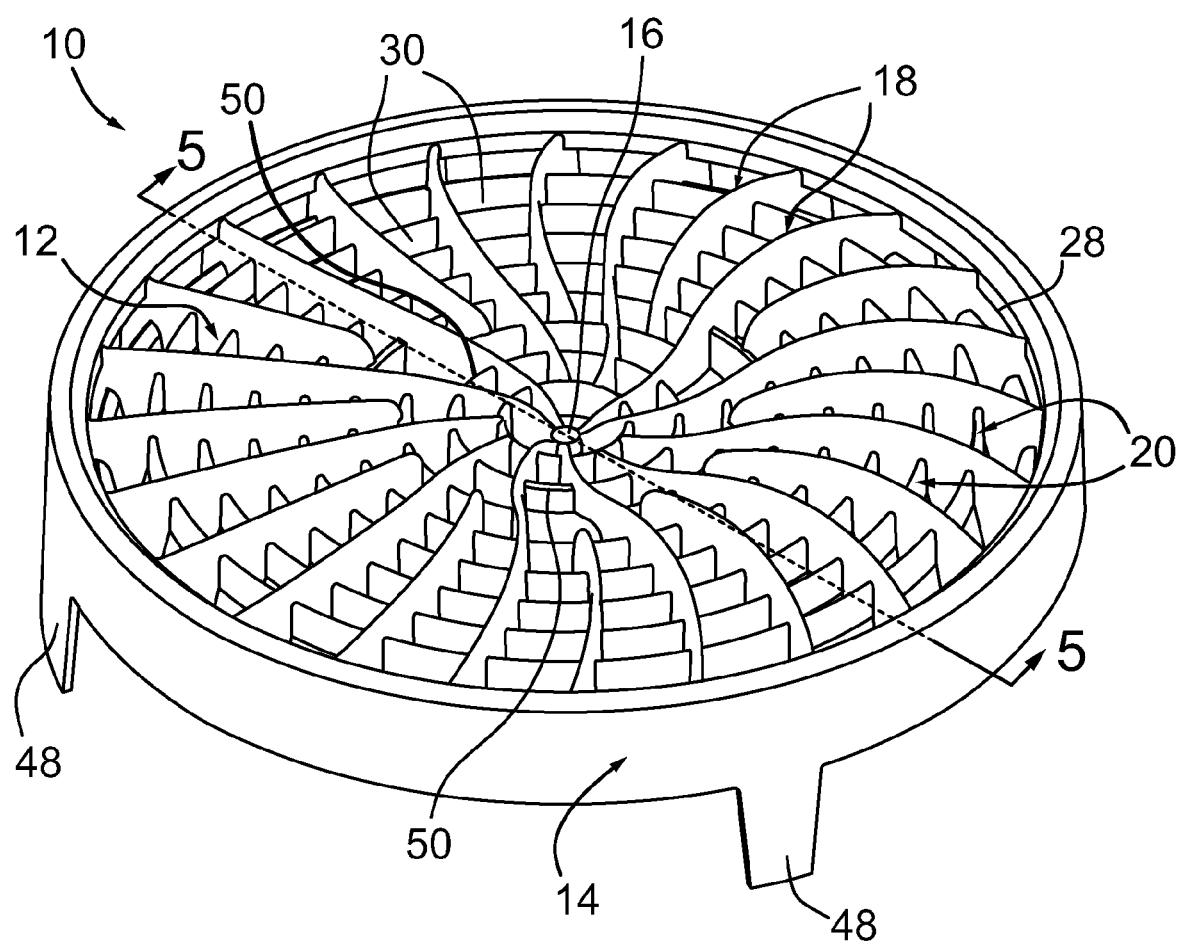
FIG. 4 is an upper perspective view of a filter according to another embodiment of the present invention.

As shown in the embodiment of FIG. 4, gripping portions 50 may be situated about hub 16. Gripping portions 50 may comprise a ledge or finger holes which a user may grip in order to lift filter 10 from container 100 after use.

While a circular flow director and skirt are shown in attached drawings, it will be understood that the filter may instead be formed into different shapes, including a variety of different polygonal shapes or an asymmetrical rounded shape.

Further, in the depicted embodiments, radial blades 18 and concentric vanes 20 are shown to be orientated generally perpendicular to one another, extending generally perpendicularly away from second face 26 towards first face 24. In a further alternate embodiment, radial blades 18 and/or concentric vanes 20 may be orientated at an angle relative to one another, or they may extend at an angle away from second face 26. In this manner, the angled orientation of radial blades 18 may help to further impart motion to the fluid as fluid travels from above flow director 12 to below flow director 12. The angled orientation of concentric vanes 20 may help to further direct fluid towards hub 16 as fluid travels from above flow director 12 to below flow director 12.

It is to be understood that what has been described are the preferred embodiments of the invention. The scope of the claims should not be limited by the preferred embodiments set forth above, but should be given the broadest interpretation consistent with the description as a whole.

The invention claimed is:

1. A filter for filtering particles in a container of fluid, the filter comprising:
   a flow director comprising a hub, a plurality of radial blades extending from the hub and a plurality of vanes concentric about the hub, the blades and the vanes intersecting to form a grid having a first face, an opposed second face, and a perimeter, the radial blades and concentric vanes collectively defining a plurality of openings formed therebetween, each opening extending between the first face and the second face where a cross-sectional area of each opening decreases from the first face to the second face; and
   a skirt coupled to the perimeter of the flow director for maintaining the flow director in spaced relation from a bottom of the container, the skirt compartmentalizing the container so that the flow director acts as a divider between fluid above and below the flow director,
   wherein the skirt and an outermost concentric vane are spaced apart to form a fluid return region therebetween, the fluid return region including fluid return passageways allowing fluid directed to the fluid return region to flow from a position below the flow director to a position above the flow director,
   wherein the decrease in cross-sectional area of the openings in the grid helps to prevent particles from travelling from a position below the flow director to a position above the flow director, and
   wherein the fluid return passageways have a bottom rim formed by the outermost concentric vane and a top rim formed by the skirt, such that as fluid travels upwardly through the fluid return passageways, drag exerted on the fluid by the bottom rim helps to direct fluid downwardly back through the flow director.

2. The filter of claim 1, wherein the skirt has an increasing diameter as it extends away from the second face, the skirt being formed from a material that is deformable to accommodate walls of containers having differing internal dimensions.

3. The filter of claim 2, wherein the skirt includes notches positioned at the outer rim to allow the skirt to deform when accommodating containers of different internal dimensions.

4. The filter of claim 2, wherein the skirt comprises one or more legs extending away from the second face, the legs being pliable to allow the filter to accommodate containers of different internal dimensions.

5. A filter for filtering particles in a container of fluid, the filter comprising:
   a flow director comprising a hub, a plurality of radial blades extending from the hub and intersecting with a plurality of vanes concentric about the hub, the plurality of radial blades and the plurality of concentric vanes defining a first face and an opposed second face, the radial blades and concentric vanes further defining a plurality of openings, each opening extending between the first face and the second face,
   each of the concentric vanes in the form of an inverted V-shaped trough having a closed end and an open end, wherein the closed end of the trough forms a top edge of the concentric vane and the open end of the trough forms a bottom edge of the concentric vane, the V-shaped troughs decreasing a cross-sectional area of each opening from the first face to the second face; and a skirt coupled to a perimeter of the flow director for maintaining the flow director in spaced relation from a bottom of the container, thereby compartmentalizing the container so that the flow director acts as a divider between fluid above and below the flow director, wherein the decrease in cross-sectional area of the openings helps to prevent particles from travelling from a position below the flow director to a position above the flow director, wherein the skirt and an outermost concentric vane are spaced apart to form a fluid return region therebetween, the fluid return region including fluid return passageways allowing fluid directed to the fluid region to flow from a position below the flow director to a position above the flow director, and wherein the fluid return passageways have a bottom rim formed by the outermost concentric vane and a top rim formed by the skirt, such that as fluid travels upwardly through the fluid return passageways drag exerted on the fluid by the bottom rim helps to direct fluid downwardly back through the flow director.

6. A filter for filtering particles in a container of fluid, the filter comprising:

a flow director comprising a hub, a plurality of radial blades extending from the hub and a plurality of vanes concentric about the hub, the blades and the vanes intersecting to form a grid having a first face, an opposed second face, and a perimeter, the radial blades and concentric vanes collectively defining a plurality of openings formed therebetween, each opening extending between the first face and the second face where a cross-sectional area of each opening decreases from the first face to the second face; and a skirt coupled to the perimeter of the flow director for maintaining the flow director in spaced relation from a bottom of the container, the skirt compartmentalizing the container so that the flow director acts as a divider between fluid above and below the flow director, wherein the skirt and an outermost concentric vane are spaced apart to form a fluid return region therebetween, the fluid return region including fluid return passageways allowing fluid directed to the fluid return region to flow from a position below the flow director to a position above the flow director' wherein the fluid return passageways have a bottom rim formed by the outermost concentric vane and a top rim formed by the skirt, such that as fluid travels upwardly through the fluid return passageways, drag exerted on the fluid by the bottom rim helps to direct at least some of the fluid passing through the fluid return passageways downwardly back through the flow director.

* * * * *